US010168947B2

(12) United States Patent
Wang et al.

(10) Patent No.: US 10,168,947 B2
(45) Date of Patent: Jan. 1, 2019

(54) VIRTUAL FILE SYSTEM WITH VNODE RECONSTRUCTION CAPABILITY

(71) Applicant: VMware, Inc., Palo Alto, CA (US)

(72) Inventors: Wenguang Wang, Santa Clara, CA (US); Yunshan Lu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 175 days.

(21) Appl. No.: 14/706,879

(22) Filed: May 7, 2015

(65) Prior Publication Data

US 2016/0328299 A1  Nov. 10, 2016

(51) Int. Cl.
*G06F 11/00* (2006.01)
*G06F 3/06* (2006.01)

(52) U.S. Cl.
CPC ............ *G06F 3/0649* (2013.01); *G06F 3/067* (2013.01); *G06F 3/0611* (2013.01); *G06F 3/0643* (2013.01); *G06F 3/0665* (2013.01); *G06F 3/0689* (2013.01)

(58) Field of Classification Search
CPC ........... G06F 17/30233; G06F 11/1402; G06F 11/1435; G06F 11/1438; G06F 17/30091; G06F 2212/152; G06F 3/064; G06F 3/0643; G06F 3/0665; G06F 3/065; G06F 17/30067; G06F 3/0667; G06F 11/1448; G06F 3/0617; G06F 2212/314; G06F 12/0877
See application file for complete search history.

(56) References Cited

U.S. PATENT DOCUMENTS

| 5,388,257 | A | * | 2/1995 | Bauer | G06F 17/30106 707/741 |
| 5,412,808 | A | * | 5/1995 | Bauer | G06F 17/30179 707/822 |
| 5,950,205 | A | * | 9/1999 | Aviani, Jr. | G06F 12/123 |
| 6,163,856 | A | * | 12/2000 | Dion | G06F 11/2071 709/213 |
| 7,099,866 | B1 | * | 8/2006 | Crosbie | G06F 21/552 |
| 7,373,520 | B1 | * | 5/2008 | Borthakur | G06F 17/30097 705/51 |
| 8,112,593 | B2 | * | 2/2012 | Pandey | G06F 17/30067 709/226 |
| 8,285,684 | B2 | * | 10/2012 | Prahlad | G06F 17/30212 707/661 |
| 8,364,652 | B2 | * | 1/2013 | Vijayan | G06F 17/30156 707/692 |
| 8,930,496 | B2 | * | 1/2015 | Gokhale | G06F 11/1435 709/219 |
| 9,436,555 | B2 | * | 9/2016 | Dornemann | G06F 11/1471 |
| 9,444,811 | B2 | * | 9/2016 | Nara | H04L 67/1095 |
| 9,575,673 | B2 | * | 2/2017 | Mitkar | G06F 3/0619 |
| 9,934,242 | B2 | * | 4/2018 | Hunt | G06F 17/30174 |
| 2004/0143607 | A1 | * | 7/2004 | Beck | H04L 67/1095 |
| 2004/0153841 | A1 | * | 8/2004 | Beck | G06F 11/0727 714/42 |
| 2005/0065986 | A1 | * | 3/2005 | Bixby | G06F 17/30088 |

(Continued)

*Primary Examiner* — Loan L. T. Truong
(74) *Attorney, Agent, or Firm* — Loza & Loza, LLP (57) ABSTRACT

A virtual file system and method for performing virtual file system operations uses a vnode descriptor to access a vnode for a vnode operation. If the vnode is not found in a vnode cache using the vnode descriptor, the vnode is reconstructed using information regarding the vnode found outside of the vnode cache using the vnode descriptor.

17 Claims, 4 Drawing Sheets

(56) References Cited

U.S. PATENT DOCUMENTS

| | | | | |
|---|---|---|---|---|
| 2008/0288506 A1* | 11/2008 | Brown | G06F 11/1435 | |
| 2009/0182792 A1* | 7/2009 | Bomma | G06F 17/30191 | |
| 2010/0082672 A1* | 4/2010 | Kottomtharayil | G06F 11/1451 | 707/770 |
| 2010/0262586 A1* | 10/2010 | Rosikiewicz | G06F 17/30067 | 707/679 |
| 2012/0005244 A1* | 1/2012 | Obata | G06F 9/45537 | 707/812 |
| 2012/0159081 A1* | 6/2012 | Agrawal | G06F 12/0866 | 711/141 |
| 2012/0310890 A1* | 12/2012 | Dodd | G06F 11/1451 | 707/646 |
| 2013/0262397 A1* | 10/2013 | Hebert | G06F 21/6236 | 707/687 |
| 2014/0115019 A1* | 4/2014 | Matsuzawa | G06F 3/0607 | 707/827 |
| 2015/0032793 A1* | 1/2015 | Dogu | H04L 67/06 | 709/201 |
| 2015/0089019 A1* | 3/2015 | Chou | G06F 17/30174 | 709/217 |
| 2015/0106470 A1* | 4/2015 | Brand | H04L 67/1097 | 709/213 |
| 2015/0199269 A1* | 7/2015 | Bert | G06F 12/0246 | 711/103 |
| 2016/0019002 A1* | 1/2016 | Kurtin | G06F 3/0619 | 711/162 |
| 2016/0117734 A1* | 4/2016 | Lin | G06Q 30/0267 | 705/14.64 |

\* cited by examiner

VIRTUAL FILE SYSTEM WITH VNODE RECONSTRUCTION CAPABILITY

BACKGROUND

Virtual file system (VFS) is a common component in most operating system (OS) kernels to interface with different file systems so that application processes running on the OS can transparently create, manipulate and access data using the different file systems without specific knowledge regarding the different file systems. VFS implements common functions in the different file system and can be viewed as acting as a multiplexer of the different file systems for the application processes.

Currently, typical VFS design is based on VFS developed for Unix-like kernels, which calls a file system object, such as a file or a directory, a "vnode" or virtual node. In order to speed up repeated access to file system objects, the vnodes are stored in a vnode cache. The life cycles of the vnodes in the vnode cache are managed using multiple reference counts, such as use count, I/O count and kernel use count, which introduce significant complexity to the VFS design. As a result, codes for such a VFS design may be error-prone and hard to understand.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
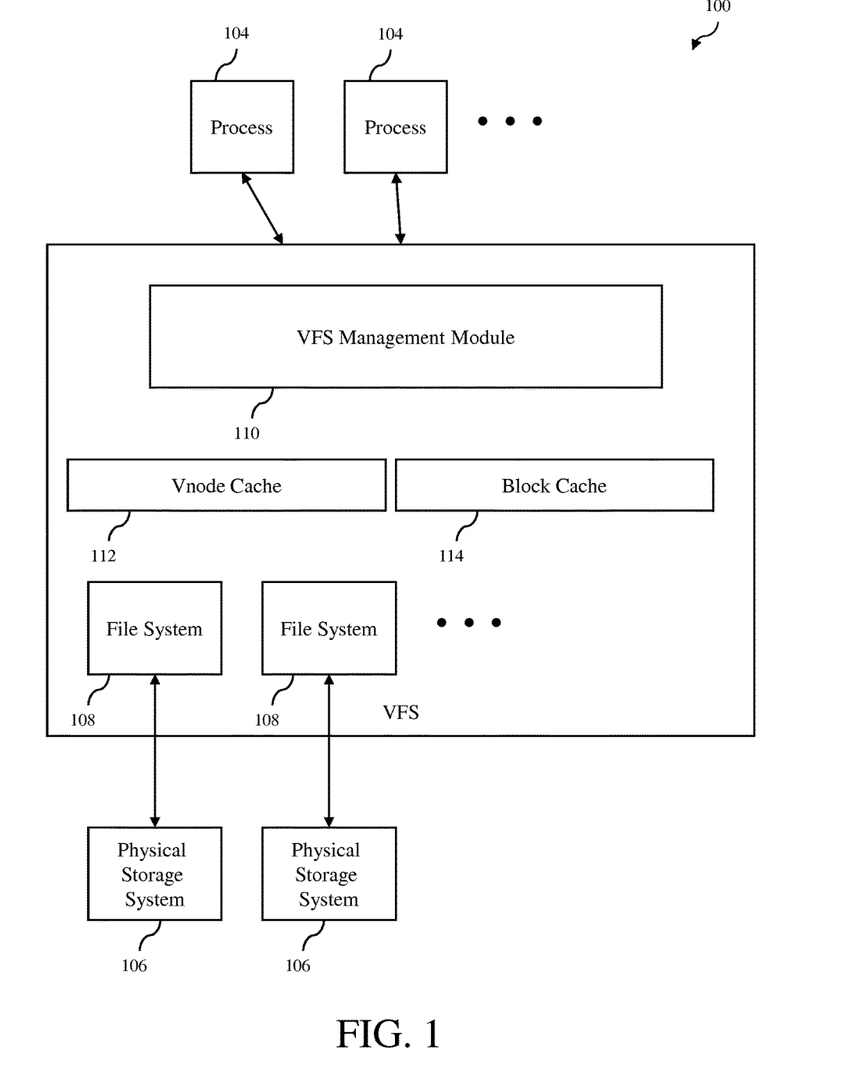
FIG. 1 is a block diagram of a file system architecture in a computer system in accordance with an embodiment of the invention.

Turning now to FIG. 1, a file system architecture 100 in a computer system in accordance with an embodiment of the invention is illustrated. As shown in FIG. 1, the file system architecture includes a virtual file system (VFS) 102 that interfaces between application processes 104 and one or more physical storage systems 106. The VFS allows the application processes to transparently access the different physical storage systems to create, manipulate and access file system objects, such as files and directories, in the physical storage systems, which are controlled by different file systems 108. In the illustrated embodiment, the VFS resides in an operating system (OS), and similar to other VFS designs in Unix-like OS kernels, the VFS uses "vnodes" or virtual nodes as representations of the file system objects, which are cached for subsequent use by the VFS. However, as described in detail below, the VFS uses vnode descriptors, rather than vnode cache pointers for repeat accesses to the vnodes. As a result, the process of managing the life cycle of the vnodes using complex life cycle state information that includes one or more complex reference counts, such as use count, I/O count and kernel use count, is eliminated, which significantly reduces the complexity of the VFS.

The application processes 104 can be any software processes running on the OS with the VFS 102. These application processes can access the underlying physical storage systems 106 using system calls to create, manipulate and access any file system objects, such files and directories, for their operation. The physical storage systems 106 can be any type of a storage system, such as a local disk drive, a remote disk drive or a network attached storage (NAS). The physical storage systems are controlled by the corresponding file systems 108, which may be considered to be part of the VFS. Each of the file systems can be any type of a file systems, such as a Fire Allocation Table (FAT) based file system, a new technology file system (NTFS), a second extended filesystem (EXT2), a third extended filesystem (EXT3) and a Network File System (NFS).

As shown in FIG. 1, the VFS 102 includes a VFS management module 110, a vnode cache 112, a block cache 114 and the file systems 108. Although only these components of the VFS are illustrated in FIG. 1, the VFS may include additional components or software modules that are commonly found in a VFS.

The VFS management module 110 performs virtual file system operations related to communications between the application processes 104 and the different file systems 108. The VFS management module uses abstractions that are called virtual nodes or "vnodes" to represent file system objects, which are called index nodes or "inodes" by the file systems. Thus, there is a one-to-one relationship between the vnodes and the inodes. That is, for each individual inode, there is only one corresponding vnode. The file system objects represented by inodes and corresponding vnodes include files and directories. Vnodes used by the VFS management module are similar to conventional vnodes used in other VFSs. However, the vnodes used by the VFS management module 110, do not have any complex life cycle management information, for example, complex reference counts, such as use count, I/O count and kernel use count.

Figure 2:
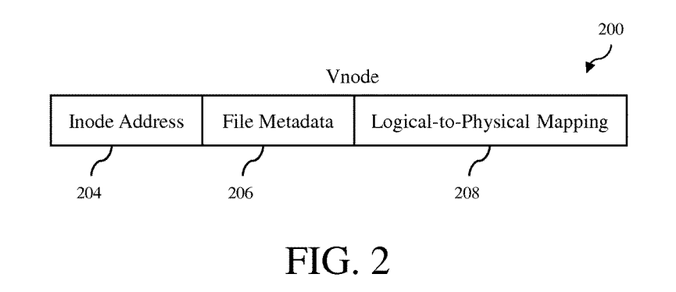
FIG. 2 is a block diagram of a vnode in accordance with an embodiment of the invention.

An example of a vnode 200 used by the VFS management module 110 is illustrated in FIG. 2. In this example, the vnode is a representation of a file stored in one of the physical storage systems 106. As shown in FIG. 2, the vnode includes an inode address 204, file metadata 206 (e.g., size, creation time, owner, mode etc.) and logical-to-physical mapping information 208. However, in contrast to vnodes used in other VFSs, the vnode 200 does not include any complex life cycle management information using one or more complex reference counts. That is, the vnode 200 does not include any complex reference count as part of the life cycle management information that is used to ensure that the vnode is not evicted from the vnode cache 112 until it is no longer needed. The reason why complex life cycle management information is not needed for the vnode 200 is because, in the VFS 102, the vnodes can be readily reconstructed on-demand, as described in more detail below. Thus, there is no need to manage the life cycle of the vnodes, such as the vnode 200, using one or more complex reference counts, which is critical in other VFS designs.

Turning back to FIG. 1, the VFS management module 110 executes vnode operations in response to file system requests or calls from the application processes 104 so that operations corresponding to the file system requests can be executed by the appropriate file systems 108. In particular, the VFS management translates file system independent instructions from the application processes into corresponding file system dependent instructions using the vnode operations. In an embodiment, the VFS management module performs the translations using a lookup table. The entries in the lookup table are created when a file system is mounted and initialized for use by the VFS 102. The vnode operations may include, for example, perform a path name lookup, create a new file, rename a file, open a file, close a file, create a new directory, remove a directory, etc., which are performed using vnodes. Thus, the VFS management module is able to create or construct vnodes and then use the vnodes for various operations, including read and write operations. These vnodes are temporarily stored in the vnode cache 112 for fast repeat accesses to file system objects that the vnode represent. Unlike other VFSs that use vnode cache pointer to access the vnodes, the VFS management module uses vnode descriptors to access the vnodes. The vnode descriptors includes information to either find the vnode inside the vnode cache 112 or to reconstruct the vnode from information regarding the vnode found outside of the vnode cache, such as the block cache 114 or the physical storage systems 106. In some implementations, the vnode descriptor for each vnode may include on-disk location information of the inode that corresponds to the vnode such as an inode address and/or mount point information, which can be used to search for the vnode in the vnode cache or any other cache, e.g., the block cache 114, or to search for information regarding the vnode in the physical storage systems 106.

The vnode cache 112 used to temporarily store the vnodes can be any type of a cache. The vnode cache may be designed to evict vnodes for any reasons. Thus, the vnode cache does not use any state information regarding the vnodes in order to evict any vnode from the vnode cache. In an embodiment, the vnode cache is stateless, and thus, the vnode cache is a write through cache so that changes to data are propagated throughout all stored locations, e.g., the block cache 114 and the corresponding physical storage systems 106. The statelessness of the vnode cache 112 allows vnodes to be called in the VFS 102 using vnode descriptors rather than vnode cache pointers. In other VFSs, since vnode cache pointers are used to access the vnodes, the vnodes in use must be maintained in the vnode cache. Thus, a complex mechanism is needed in these other VFSs to ensure that the vnodes are maintained in the vnode cache if the vnodes are needed for subsequent operations. This complex mechanism typically requires the use of life cycle management information in the form of complex reference counts, such as use count, I/O count and kernel use count. With this mechanism, the vnodes are only evicted from the vnode cache when the reference counts indicate that the vnodes can be evicted. Otherwise, a system error would occur if a vnode is evicted prematurely. However, in the VFS 102, as explained above, vnodes are called using vnode descriptors, which are used to find the vnodes in the vnode cache 112 or other locations, e.g., the block cache 114 or the physical storage systems 106. Thus, when a vnode is needed, the vnode cache is first searched to locate the vnode using the vnode descriptor. If not present in the vnode cache, the block cache is then searched to locate the vnode using the same vnode descriptor. If not present in the block cache, the vnode is reconstructed from a particular physical storage system using the vnode descriptor, which indicates the location of the information stored in the physical storage system to reconstruct the vnode. Thus, since the vnodes can be reconstructed, the vnode cache 112 does not need a complex mechanism to ensure that the needed vnodes are strictly maintained in the vnode cache.

The block cache 114 can be any type of a cache commonly found in a VFS. The block cache can be used to store blocks of data from the physical storage systems 106 that are being used by the VFS 102, including blocks of inodes, in order to increase data access performance of the VFS. As explained above, when a vnode is not found in the vnode cache 112, the block cache 114 may be searched to see if the vnode (i.e., the corresponding inode) is located in the block cache to reconstruct the vnode in the vnode cache. In other embodiments, the VFS 102 may include one or more additional caches. In these embodiments, if a vnode of interest is not found in the vnode cache 112, these additional caches may be subsequently searched in any order. If the vnode of interest is not found in any cache used by the VFS 102, then information regarding the vnode may be retrieved from one of the physical storage systems 106.

In operation, the VFS 102 constructs vnodes to perform file system operations in response to system calls from the application processes 104 and then access these vnodes to perform subsequent file system operations. The vnodes constructed by the VFS do not have any complex life cycle management information since the vnodes can be reconstructed on demand as needed if the vnodes have been evicted from the vnode cache 112. A vnode that is constructed or reconstructed by the VFS can be similar to the vnode illustrated in FIG. 2. When the vnodes are needed for file system operations, the VFS uses vnode descriptors rather than pointers to the vnode cache to retrieve the vnode. The vnode descriptors are used to locate the vnodes in the vnode cache. If the vnodes are not found in the vnode cache, then the vnodes are reconstructed by reading the vnode information from the block cache 114 or from the underlying physical storage system 106.

In an embodiment, in order to reconstruct the vnode from the block cache 114 or from the underlying physical storage system 106, the address of the block that includes the inode that corresponds to the vnode being located is calculated using the vnode descriptor, which includes on-disk location information of the inode. Using the block address, the block containing the inode is retrieved from the block cache if the block is found in the block cache. If the block is not found in the block cache or if no block cache exists, then the block containing the inode is read directly from the persistent storage, i.e., the underlying physical storage system. Next, an empty vnode entry is constructed from the vnode cache 112. In some situations, the vnode cache may need to evict some other vnode before constructing the empty vnode. After the empty vnode is constructed, inode information from the block is copied into the vnode entry. The block is then released to the block cache or discarded.

Figure 3:
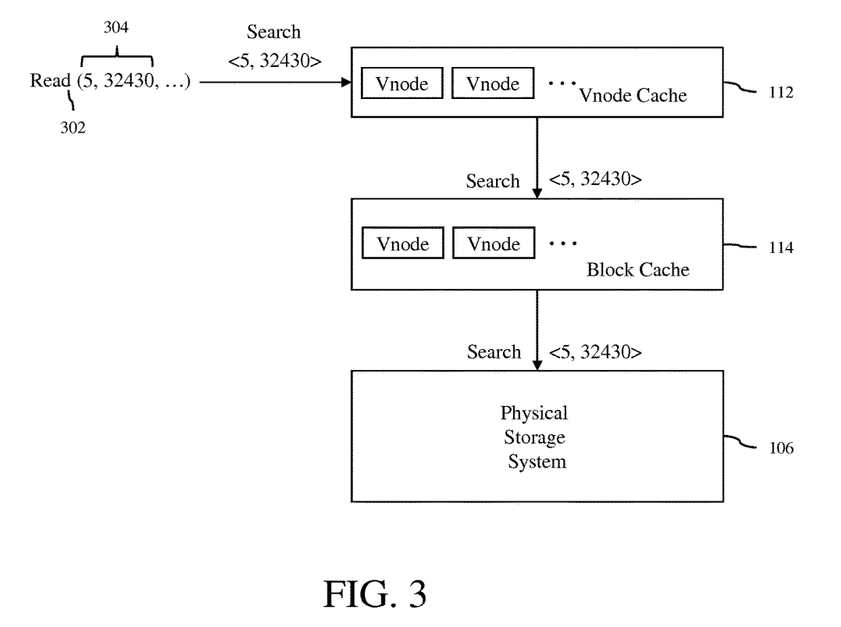
FIG. 3 illustrates an example of a reading operation performed by a virtual file system in accordance with an embodiment of the invention.

In FIG. 3, an example of a reading operation performed by the VFS 102 is illustrated. As shown in FIG. 3, the read operation involves a read instruction 302 that identifies a vnode using a vnode descriptor 304, which includes volume number "5" and inode address of "32430". The vnode descriptor is used to search for the desired vnode in the vnode cache 112. That is, the vnode descriptors of the vnodes in the vnode cache are parsed to see if any of the vnode descriptors matches the vnode descriptor of the desired vnode. In this example, <5, 32430> is used to try to locate the desired vnode in the vnode cache. If the desired vnode is found in the vnode cache, the vnode is read from the vnode cache. However, if the desired vnode is not found in the vnode cache, the vnode descriptor is used to search for the vnode in the block cache 114. If the desired vnode (or the corresponding inode) is found in the block cache, then the vnode is read from the block cache and the desired vnode is reconstructed, i.e., a new vnode cache entry is created. However, if the desired vnode is not found in the block cache, the vnode descriptor may be used to search for the information regarding the vnode in the appropriate physical storage system 106, i.e., the persistent media that has the stored information corresponding to the vnode.

Below is a pseudo-code that illustrates an example of a read operation processed by the VFS 102 in accordance with an embodiment of the invention.

```
1.  // vnode is in the vnode cache, whose key is pair <vol,
    inode_address>
2.  struct vnode {
3.    mount *vol; // which volume this vnode belongs to
4.    int64 inode_address;
5.    int64 parent_inode_address;
6.    stat inode_stat; // creation time, owner, mode, ...
7.    Mapping *file_mapping; // maps file logical offset to on-disk
        physical offset
8.  };
```

-continued

```
9.  vnode_op_read(mount *vol, int64 inode_address, off_t offset,
      size_t size, char *buf)
10. {
11.   vnode *vp = get_vnode(vol, inode_address);
12.   Find out mapping for [offset, offset + size) in vp->file_mapping ;
13.   Issue read to the physical address;
14. }
15. Vnode *get_vnode(mount *vol, int64 inode_address)
16. {
17.   Search <vol, inode_address> in the vnode cache;
18.   if (not found) {
19.     Read inode info from the underlying storage (e.g., block cache);
20.     Insert new vnode entry into vnode cache;
21.   }
22.   return the vnode entry;
23. }
```

In the above pseudo-code, lines 1-8 describe the vnode of interest, including the contents of the vnode, which include volume, an inode address, a parent inode address, stats of the inode and mapping information. Lines 9-15 describes the algorithm to perform the read operation. In particular, line 9 describes the read vnode operation, which includes volume, an inode address, offset value, size value and buffer value. Line 11 describes an instruction to get the vnode of interest, which includes the volume and the inode address to find the vnode. Line 12 describes an instruction to find mapping information for the vnode. Line 14 describes an instruction to issue read message to the physical address. Lines 15-22 describes the steps to get the vnode of interest for the read operation. Line 15 describes an instruction to get the vnode of interest. Line 17 describes the search operation to be performed on the vnode cache 112. Lines 18-19 describes the steps to read inode information corresponding to the vnode of interest from the underlying storage, such as the block cache 114 or the appropriate physical storage system 106. Line 20 describes an instruction to insert new vnode entry into the vnode cache using the inode information. Thus, the vnode of interest is reconstructed using the inode information. Line 22 describes an instruction to return the vnode entry.

Figure 4:
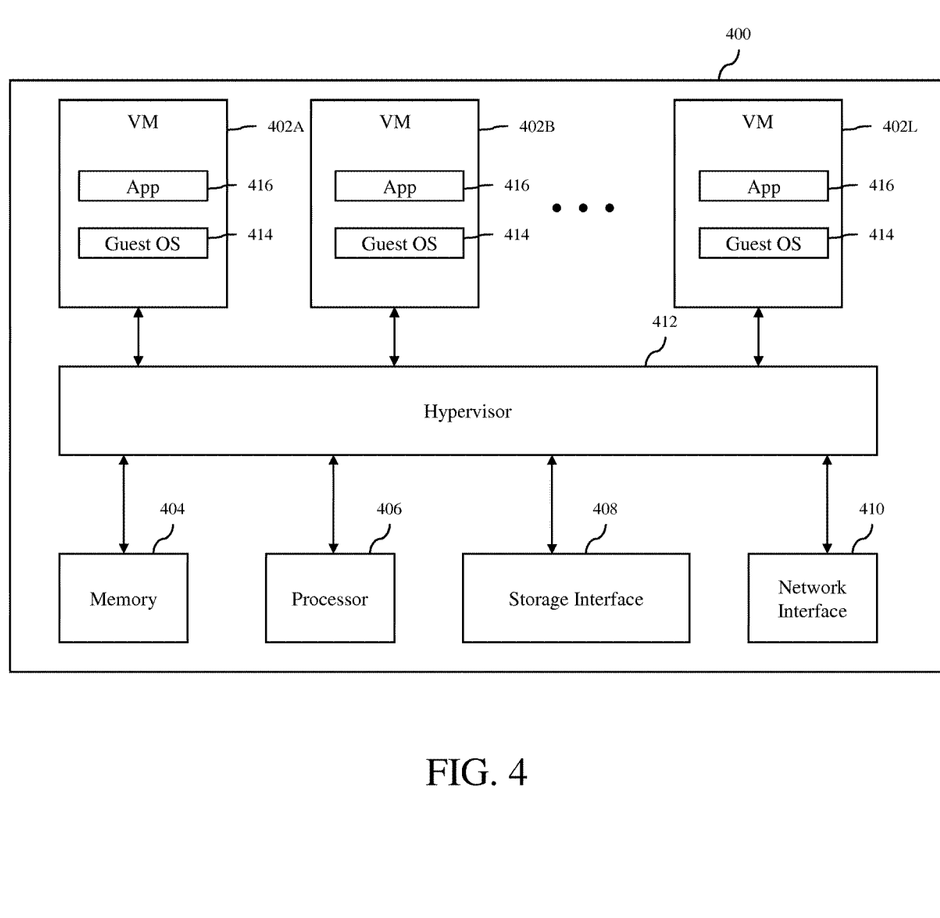
FIG. 4 is a block diagram of a physical computer system with a number of virtual machines in which the virtual file system in accordance with an embodiment of the invention may be implemented.

As explained above, the VFS 102 is part of an OS of a computer system, which may be a physical computer system, such as a physical server, or a virtual computer system, such as a virtual machine. Turning now to FIG. 4, a physical computer system 400 in which the VFS 102 may be implemented is shown. In FIG. 4, the physical connections between the various components of the computer system are not illustrated. As shown in FIG. 4, the physical computer system is configured to support a number of virtual machines (VMs) 402A, 402B . . . 402L (where L is a positive integer). The number of VMs supported by the physical computer system can be anywhere from one to more than one hundred. The exact number of VMs supported by the physical computer system is only limited by the physical resources of the physical computer system. The VMs share at least some of the hardware resources of the physical computer system, which include one or more system memories 404, one or more processors 406, a storage interface 408, and a network interface 410. Each system memory, which may be random access memory (RAM), is the volatile memory of the physical computer system. Each processor can be any type of a processor, such as a central processing unit (CPU) commonly found in a personal computer. The storage interface is an interface that allows that physical computer system to communicate with one or more physical storage systems. As an example, the storage interface may be a host bus adapter or a network file system interface. The network interface is an interface that allows the physical computer system to communicate with other devices through one or more computer networks. As an example, the network interface may be a network adapter.

In the illustrated embodiment, the VMs 402A, 402B . . . 402L run on "top" of a hypervisor 412, which is a software interface layer that, using virtualization technology, enables sharing of the hardware resources of the physical computer system 400 by the VMs. However, in other embodiments, one or more of the VMs can be nested, i.e., a VM running in another VM. Any computer virtualization architecture can be implemented. For example, the hypervisor may run on top of the physical computer system's operating system or directly on hardware of the physical computer system. With the support of the hypervisor, the VMs provide isolated execution spaces for guest software. Each VM may include a guest operating system 414, one or more guest applications 416. The guest operating system manages virtual system resources made available to the corresponding VM by the hypervisor, and, among other things, the guest operating system forms a software platform on top of which the guest applications run.

The VFS 102 may be implemented in one or more VMs 402A, 402B . . . 402L running in the physical computer system 400 as part of their OS, i.e., the guest OS 414. Thus, in this implementation, the VFS allows guest applications 416 to access physical storage systems available to the physical computer system. The VFS may also be implemented in the physical computer system as part of the host OS. Thus, the VFS may be implemented in the OS of any physical or virtual computer system.

Figure 5:
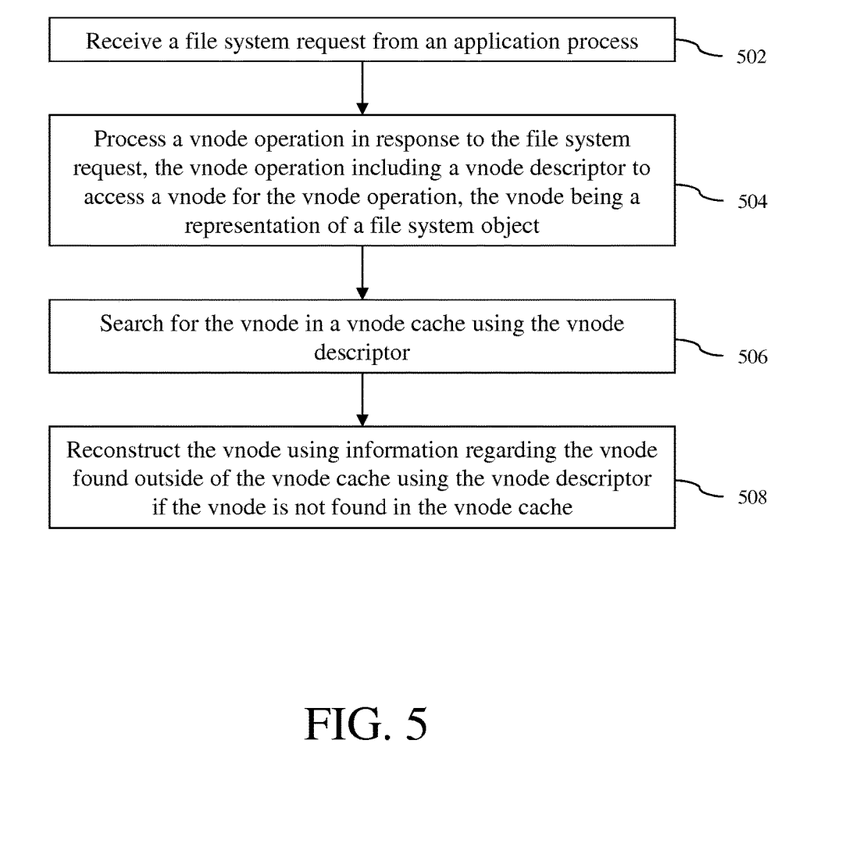
FIG. 5 is a flow diagram of a method of performing virtual file system operations in accordance with an embodiment of the invention.

A method of performing file system operations in accordance with an embodiment of the invention is described with reference to a flow diagram of FIG. 5. At block 502, a file system request from an application process is received. The file system request can be any type of request involving data storage, such as read and write requests. At block 504, a vnode operation in response to the file system request is processed. The vnode operation includes a vnode descriptor to access a vnode for the vnode operation. The vnode is a representation of a file system object. At block 506, a vnode cache is searched for the vnode using the vnode descriptor. At block 508, the vnode is reconstructed using information regarding the vnode found outside of the vnode cache using the vnode descriptor if the vnode is not found in the vnode cache.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of performing virtual file system operations comprising:
   receiving a file system request from an application process;
   processing a vnode operation in response to the file system request, the vnode operation including a vnode descriptor to access a vnode for the vnode operation, the vnode being a representation of a file system object and corresponding to a particular inode, wherein the vnode has a one-to-one relationship with the particular inode;
   searching for the vnode in a vnode cache using the vnode descriptor, the vnode including an address of the particular inode and metadata of the file system object; and
   reconstructing the vnode using the vnode descriptor if the vnode is not found in the vnode cache, including searching another cache using the vnode descriptor to find information regarding the vnode to reconstruct the vnode if the another cache exists, and then searching for the information regarding the vnode from a physical storage system if the information regarding the vnode is not found in the another cache.

2. The method of claim 1, wherein the processing of the vnode operation includes processing the vnode operation in which the vnode operation does not include a vnode cache pointer.

3. The method of claim 2, wherein the vnode descriptor includes an inode address of the particular inode that corresponds to the vnode.

4. The method of claim 3, wherein the vnode descriptor includes a mount point of the particular inode.

5. The method of claim 1, wherein the vnode does not include any complex reference count as part of life cycle management information for the vnode.

6. The method of claim 1, wherein the vnode descriptor includes a volume number and the address of the particular inode.

7. A computer-readable storage medium containing program instructions for a method of performing virtual file system operations, wherein execution of the program instructions by one or more processors of a computer system causes the one or more processors to perform steps comprising:

receiving a file system request from an application process;

processing a vnode operation in response to the file system request, the vnode operation including a vnode descriptor to access a vnode for the vnode operation, the vnode being a representation of a file system object and corresponding to a particular inode, wherein the vnode has a one-to-one relationship with the particular inode;

searching for the vnode in a vnode cache using the vnode descriptor, the vnode including an address of the particular inode and metadata of the file system object; and reconstructing the vnode using the vnode descriptor if the vnode is not found in the vnode cache, including searching another cache using the vnode descriptor to find information regarding the vnode to reconstruct the vnode if the another cache exists, and then searching for the information regarding the vnode from a physical storage system if the information regarding the vnode is not found in the another cache.

8. The computer-readable storage medium of claim 7, wherein the processing of the vnode operation includes processing the vnode operation in which the vnode operation does not include a vnode cache pointer.

9. The computer-readable storage medium of claim 8, wherein the vnode descriptor includes an inode address of the particular inode that corresponds to the vnode.

10. The computer-readable storage medium of claim 9, wherein the vnode descriptor includes a mount point of the particular inode.

11. The computer-readable storage medium of claim 7, wherein the vnode does not include any complex reference count as part of life cycle management information for the vnode.

12. The computer-readable storage medium of claim 7, wherein the vnode descriptor includes a volume number and the address of the particular inode.

13. A virtual file system comprising:

memory; and a processor configured to:

receive a file system request from an application process;

process a vnode operation in response to the file system request, the vnode operation including a vnode descriptor to access a vnode for the vnode operation, the vnode being a representation of a file system object and corresponding to a particular inode, wherein the vnode has a one-to-one relationship with the particular inode;

search for the vnode in a vnode cache using the vnode descriptor, the vnode including an address of the particular inode and metadata of the file system object; and reconstruct the vnode using the vnode descriptor if the vnode is not found in the vnode cache, including searching another cache using the vnode descriptor to find information regarding the vnode to reconstruct the vnode if the another cache exists, and then searching for the information regarding the vnode from a physical storage system if the information regarding the vnode is not found in the another cache.

14. The virtual file system of claim 13, wherein the processor is configured to process the vnode operation in which the vnode operation does not include a vnode cache pointer.

15. The virtual file system of claim 14, wherein the vnode descriptor includes an inode address of the particular inode that corresponds to the vnode.

16. The virtual file system of claim 15, wherein the vnode descriptor includes a mount point of the particular inode.

17. The virtual file system of claim 13, wherein the vnode descriptor includes a volume number and the address of the particular inode.

* * * * *